(12) United States Patent
Albani (10) Patent No.: US 8,789,167 B2
(45) Date of Patent: Jul. 22, 2014

(54) FRAUD-PROOF LOCATION IDENTIFICATION SYSTEM

(76) Inventor: Andrea Albani, Seattle, WA (US)

( * ) Notice: Subject to any disclaimer, the term of this patent is extended or adjusted under 35 U.S.C. 154(b) by 0 days.

(21) Appl. No.: 13/594,479

(22) Filed: Aug. 24, 2012

(65) Prior Publication Data

US 2014/0059665 A1  Feb. 27, 2014

(51) Int. Cl.
| | | |
|---|---|---|
| *G07B 1/08* | (2006.01) | |
| *G06F 21/31* | (2013.01) | |
| *G07B 5/04* | (2006.01) | |
| *H04L 9/32* | (2006.01) | |

(52) U.S. Cl.
CPC .............. *G06F 21/31* (2013.01); *H04L 9/3234* (2013.01); *H04L 9/3228* (2013.01)
USPC ................................................ 726/20; 726/9

(58) Field of Classification Search
None
See application file for complete search history.

(56) References Cited

U.S. PATENT DOCUMENTS

| | | | |
|---|---|---|---|
| 2005/0039014 A1* | 2/2005 | Sajkowsky | 713/172 |
| 2010/0191972 A1* | 7/2010 | Kiliccote | 713/172 |
| 2012/0134704 A1* | 5/2012 | Park | 399/75 |

OTHER PUBLICATIONS

2-Factor Authentication with 2D Barcodes. Hebbes et al. HAISA(2011).*

* cited by examiner

*Primary Examiner* — Venkat Perungavoor
(74) *Attorney, Agent, or Firm* — Davis Wright Tremaine LLP; Heather M. Colburn (57) ABSTRACT

Systems and methods for facilitating check-ins that are resistant to common fraud scenarios while also being relatively inexpensive. One or more embodiments include displaying unique tokens in quick succession on a display positioned at the check-in location (e.g., a store, restaurant, or other business or location). Customers have a short period of time (e.g., a few seconds, five minutes, etc.) to scan a particular check-in token before a new token is displayed on the display. Each token may encode a pre-determined number or identification code that cannot be guessed by the user and that can be verified by the system to validate the check-in. By periodically changing the check-in token displayed to users and limiting each token to a single use within a short timeframe, users are prevented from checking in remotely.

30 Claims, 4 Drawing Sheets

FRAUD-PROOF LOCATION IDENTIFICATION SYSTEM

BACKGROUND OF THE INVENTION

1. Field of the Invention

The present invention is directed generally to systems and methods for providing location information, and more specifically, to systems and methods for providing fraud-proof location identification using machine readable tokens.

2. Description of the Related Art

A growing number of businesses offer rewards and other programs that are based on customers "checking-in" at physical locations using mobile devices, such as smartphones. For instance, a customer may scan a two-dimensional barcode posted in a store using his or her smartphone to indicate that the customer is physically located at or near the store. However, the digital nature of the check-in process makes it possible for malicious users to check-in without actually being present at the location. For example, someone could broadcast an image of the check-in barcode so others can check-in remotely. This has resulted in widespread fraud, and the development of expensive mechanisms to counter it.

Several systems exist that mitigate or prevent check-in fraud, with varying levels of success and cost. One class of solutions is based on analyzing context, such as a phone's geo-location, or the time of the check-in. Such methods are nonetheless vulnerable to fraud (e.g., location data can be falsified). Other systems require specialized software running on a computing device at the business location. These systems may be more secure, but are relatively expensive. The computing hardware is typically a point-of-sale terminal, a tablet computer, or a smartphone, and requires network connectivity for setup, and in most cases, during check-in transactions.

DETAILED DESCRIPTION OF THE INVENTION

Embodiments of the present invention are directed to systems and methods for facilitating check-ins that are resistant to common fraud scenarios while also being relatively inexpensive. Generally, one or more embodiments of the invention include displaying "single-use" tokens in quick succession on a display positioned at the check-in location (e.g., a store, restaurant, automobile, person, or other stationary or mobile location). Customers have just a few seconds to scan a particular check-in token before a new token is displayed on the display. Each token may encode a pre-determined number or identification code that cannot be guessed by the user and that can be verified by the system to validate the check-in. By rapidly changing the check-in token displayed to users, users are prevented from checking in remotely. It should be appreciated that the "single-use" tokens may be recycled so long as there is a sufficient number of tokens to prevent users from "guessing" which token will be on display at a particular time.

In some embodiments, provisioning and displaying of the check-in tokens (or simply "tokens") in succession may be done with inexpensive hardware, without any network connection at any time, and without any specialized equipment or software. For example, a display may comprise an inexpensive digital photo frame that is pre-configured for displaying image files in succession using its built-in slideshow feature. In some embodiments, the tokens may be issued to a business in the form of a memory device (e.g., a memory card, flash drive, or the like) that contains numerous images of two-dimensional barcodes (e.g., 100 images, 10,000 images, 1,000,000 images, etc.). In other embodiments, the tokens may be sent to a business over a network connection (e.g., the internet). In these embodiments, the business may receive the tokens (e.g., image files) on a computing device over the network connection and then transfer the files (e.g., using a memory card) to the display device.

Generally, a customer uses a connected mobile device, such as a smartphone, to check-in at the location by using the mobile device's image capture device to scan the identification code or image representing the token. For example, the identification code may comprise a barcode, such as a quick response (QR) barcode. A central system or service may then verify the validity of the check-in code and record the check-in activity. The verification process does not rely on geo-location or on any activity from the business. Rather, in some embodiments, the process utilizes the check-in token's identification code and its position in a sequence of tokens displayed to verify that the token is valid and that the user was physically present at the check-in location. That is, the check-in token is known to the system (or digitally signed), should not have been previously used (at least recently), and should not be used by a user out of an expected order (e.g., sequential order, or other known order).

Figure 1:
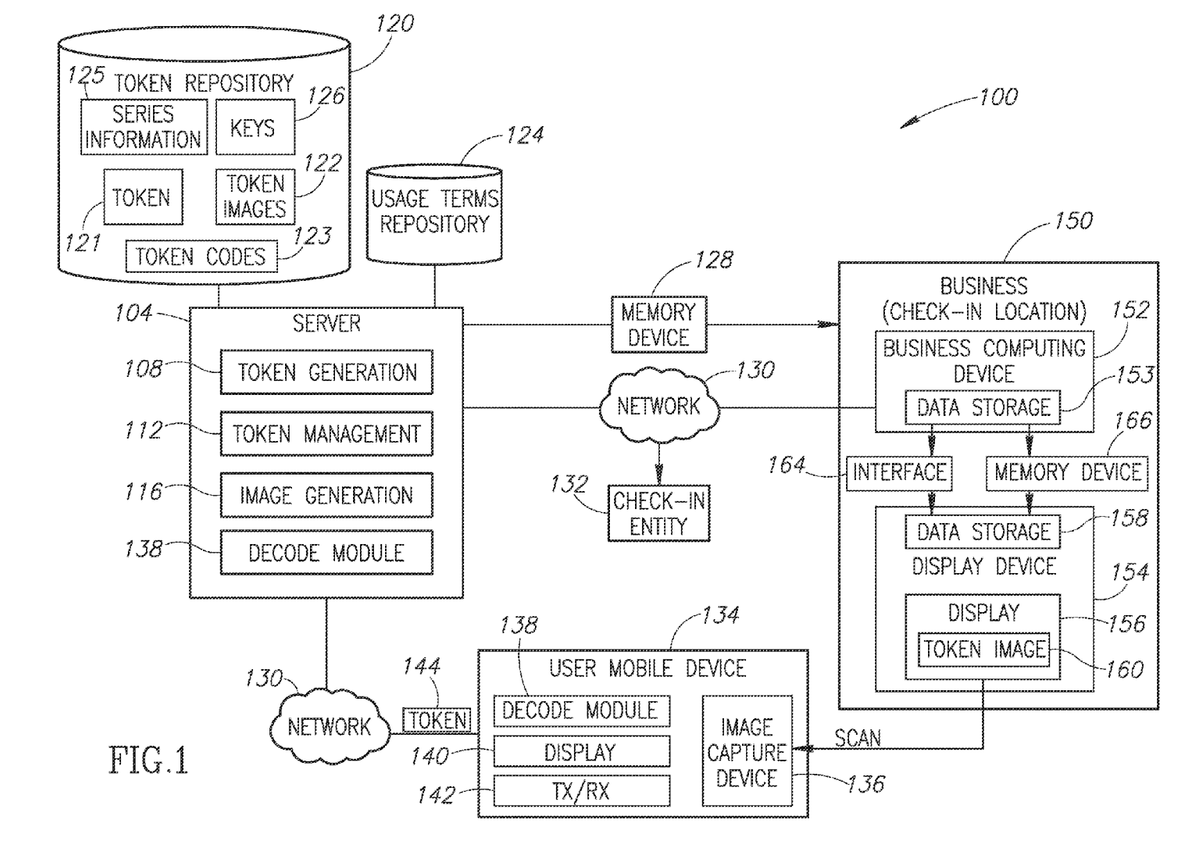
FIG. 1 is a block diagram of a system for fraud-proof location identification in accordance with an embodiment of the present invention.

FIG. 1 is an illustration of a system 100 that may be used to provide the functionality of the present invention. The system 100 includes at least one server computing device or server 104 that comprises a token generation module 108, a token management module 112, and an image generation module 116. The modules 108, 112, and 116 may be performed by the same or different servers. The server 104 is operatively coupled to a token repository data storage 120 and a usage terms repository 124 (optional).

The system 100 also comprises at least one user mobile device 134, such as a smartphone, that is operated by a user (e.g., a customer of a business). The server 104 is connected to the user mobile device 134 by a network 130 (e.g., the Internet). The network 130 may comprise a wireless network (e.g., a cellular network) and the Internet, or any other combination of wired and/or wireless networks. The network 130 may be a single network or any number of related or unrelated networks configured to allow communication between computing devices. The user mobile device 134 may also include an image capturing device 136 (e.g., a camera or scanner), a decode module 138 or application operative to use the image capturing device to read and decode a barcode (e.g., a QR barcode, or the like), a display 140, and a wireless transceiver 142. The wireless transceiver 142 allows the user mobile device 134 to send a token or check-in code 144 (e.g., a URL) to the server 104 over the network 130. In some embodiments, such as embodiments that utilize web-based interfaces, the decode module 138 resides on the server 104 rather than the user mobile device 134.

The system 100 also includes a display device 154 physically located at a business 150 or, more generally, at a "check-in" location. The check-in location may be a fixed location (e.g., a building) or a mobile location (e.g., a person, an automobile, etc.). The display device 154 comprises a display 156 for displaying token images 160 and data storage or data storage slot 158 for storing token image files 122. For example, the display device 154 may comprise a commercially available digital photo frame, digital photo keychain, etc. The data storage 158 may comprise fixed or removable data storage (e.g., memory card, etc.).

In some embodiments, the system 100 may also include a business computing device 152 operative by an operator of the business 150 that is configured to communicate with the server 104 over the network 130 to receive token image files or to receive token codes and generate image files and store them in data storage 153. Alternatively or additionally, the business computing device 152 may be operative to transfer images to the display device 154 using a wired or wireless interface 164, a removable memory device 166 insertable into a memory slot in both the computing device and the display device, or the like. In some embodiments, the image generation module 116 is part of the business computing device 152 in addition to or instead of being part of the server 104. In this case, the business computing device 152 is operative to receive token codes and generate corresponding image files that are stored in the data storage 153. In some embodiments, the server 104 and the business computing device 152 may be the same device, and/or include the same or similar functionality.

While the system 100 is illustrated as including the single server 104, the system 100 may include any number of servers that each perform the functions of the server 104 or cooperate with one another to perform those functions. Further, while the server 104 is illustrated as being connected to the user mobile device 134, the server may be connected to any number of user mobile devices and the server is not limited to use with any particular number of user mobile devices.

Figure 2:
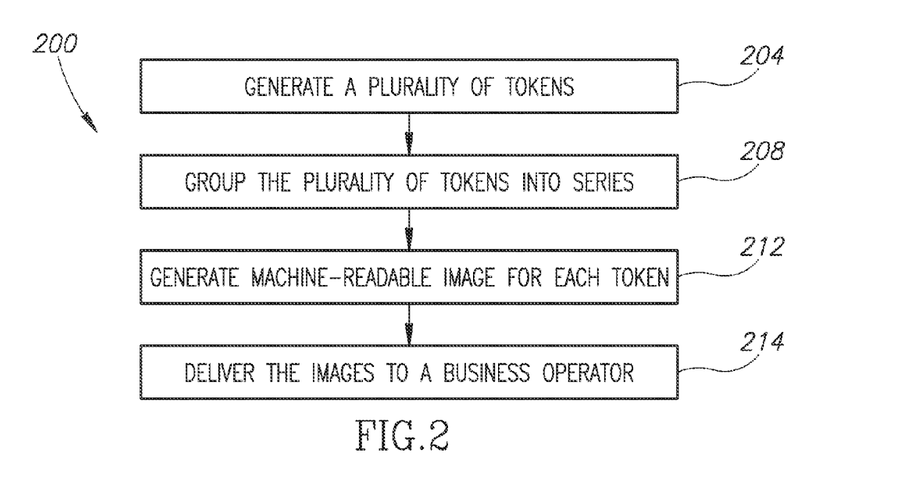
FIG. 2 is a flow chart of a method for generating and issuing check-in tokens.

FIGS. 2-5 illustrate various processes that may be implemented using the system 100 of FIG. 1 to provide fraud-proof location information or "check-in" information for use by an entity 132, which may be a social networking service, a loyalty or reward service, the business 150, or another other service or entity that can benefit from location identification information. Specifically, FIG. 2 is a flow chart of a process 200 for generating check-in tokens and issuing them to a business, so that the tokens may later be used to verify the presence of users near location(s) where the tokens are displayed. The process 200 may be performed by the token generation module 108, token management module 112, and/or image generation module 116 executing on the server 104 shown in FIG. 1.

The process 200 begins by generating a plurality of single-use tokens 121 (e.g., thousands of tokens, etc.) and saving them in the token repository data storage 120 shown in FIG. 1, block 204. Optionally, the tokens 121 may be grouped into multiple divisions or "series" to facilitate various operations, such as activation operations, block 208. Each of the tokens 121 may comprise a number, an alpha-numeric number, or any other representation. The tokens 121 may be ordered in an expected or known order, such as sequentially ordered (e.g., 1-2-3, A-B-C, etc.), so that the tokens' relative position with respect to each other is known. Each of the tokens 121 may be associated with a randomly assigned token code 123. Next, the process 200 may generate machine-readable token images or image files 122 that encode each of the token codes 123, block 212. The images may be generated by the server 104 or the business computing device 152, depending on the location of the image generation module 116. For example, the images 122 may comprise a QR barcode, or other machine-readable images operative to encode the identification of a particular token code 123, and therefore a particular token 121. The token images 122 should not allow a user to determine the actual value of the token 121 with which the image is associated, so the user is not able to guess token values that will be displayed at a particular time. Once the images 122 encoding the token codes 123 have been generated, the server 104 may deliver the encoded images 122 to a business operator, block 214. As an example, the server 104 may deliver the image files 122 to the computing device 152 of a business operator via the network 130. As can be appreciated, in the case where the computing device 152 generates the images, the server may 104 deliver token codes to the computing device rather than token images.

The business operator may then transfer the image files 122 to the display device 154 of the business 150 using a suitable memory device 166 (e.g., memory cards, flash drives, etc.). As another example, the image files 122 may be copied onto a memory device 128 and the memory device may be physically transported (e.g., shipped) to the business operator so that the business operator may insert the memory device into the display device 154 or otherwise transfer the image files to the display device.

Figure 3:
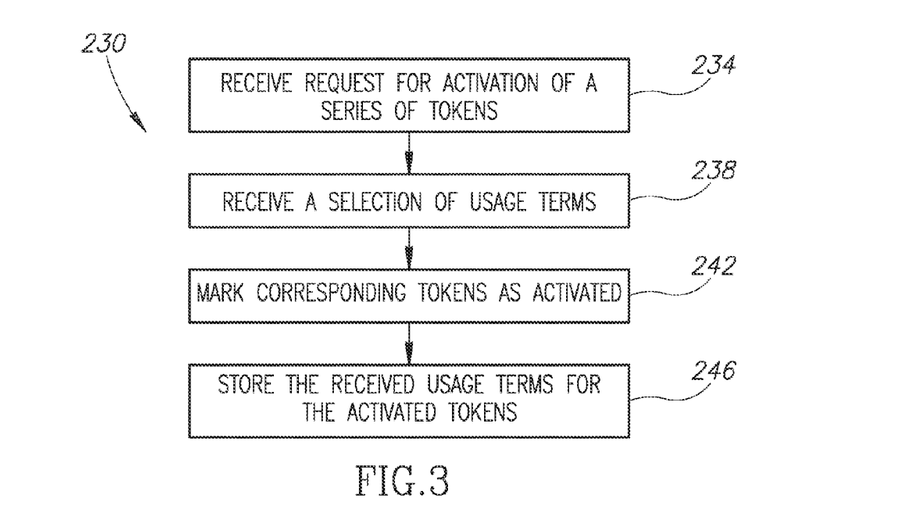
FIG. 3 is a flow chart of a method for activating check-in tokens.

FIG. 3 illustrates a process 230 for activating check-in tokens 121 for use by a business. The process 230 is optional—in some embodiments, the tokens 121 may be implicitly activated upon issuance to the business 150. In operation, the business operator may request activation of a series of previously received token images 122. For example, the business 150 may have received multiple memory devices 128 each including a series of token images 122 stored thereon, block 234. The business operator may also set the usage terms for the tokens, block 238. The usage terms may be stored in the usage terms repository 124, which is accessible by the server 104. The usage terms may include period of validity, location, reward type, reward value, etc. The business operator may perform the request for activation and set the usage terms by contacting the server 104 over the network 130 (e.g., using an Internet-connected device such as the business computing device 152, using a telephone, etc.). Once the request for activation has been made, the server 104 marks the corresponding tokens 121 as "active" in the token repository 120 and saves the selected usage terms in the usage terms repository 124. The business operator may then begin using the token images 122 corresponding to the activated tokens 121.

For example, in one embodiment the business operator may initially power on the display device 154 and scan a token image 160 displayed thereon to begin an activation process. A token code 144 may be generated for the image 160 and may be sent to the server 104 so that the server knows the particular token code 144 that was displayed at a particular time. Then, as users scan subsequently displayed token images 160, the server 104 will be operative to "track" the expected value for tokens to determine whether the user was present at the check-in location and actually scanned the token image 160.

Figure 4:
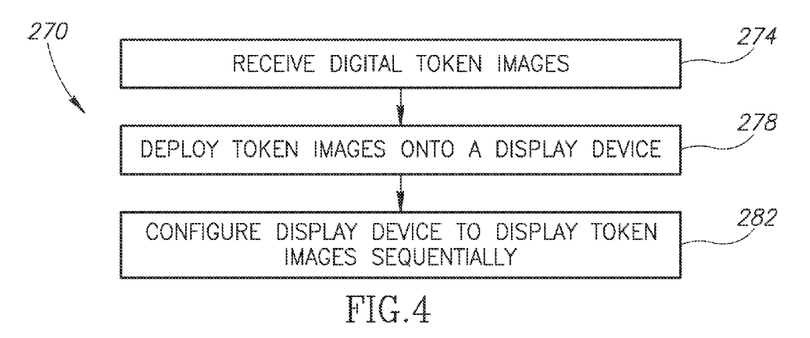
FIG. 4 is a flow chart of a method for deploying check-in tokens on a display device.

FIG. 4 illustrates a process 270 for deploying check-in tokens on a display device, such as the display device 154 shown in FIG. 1. The business operator may first receive the digital token image files 122 from the system or service 100, block 274. Next, the business operator may deploy the (activated) images 122 onto the display device 154, block 278. This step may be accomplished by inserting the memory device 166 storing the image files 122 into the data storage 158 (e.g., a memory slot) of the display device 154. Additionally or alternatively, the image files 122 may be transferred from the computing device 152 of the business operator to the display device 154 using the interface 164 (e.g., USB, Wi-Fi®, Bluetooth®, etc.). The business operator may then power on the display device 154 and configure it in such a way that the one or more of the images 160 displayed on the display device is changed periodically (e.g., every few seconds, once every five minutes, etc.), block 282. For example, the display device 154 may be configured to display token images 160 sequentially in a "slideshow" mode.

Figure 5:
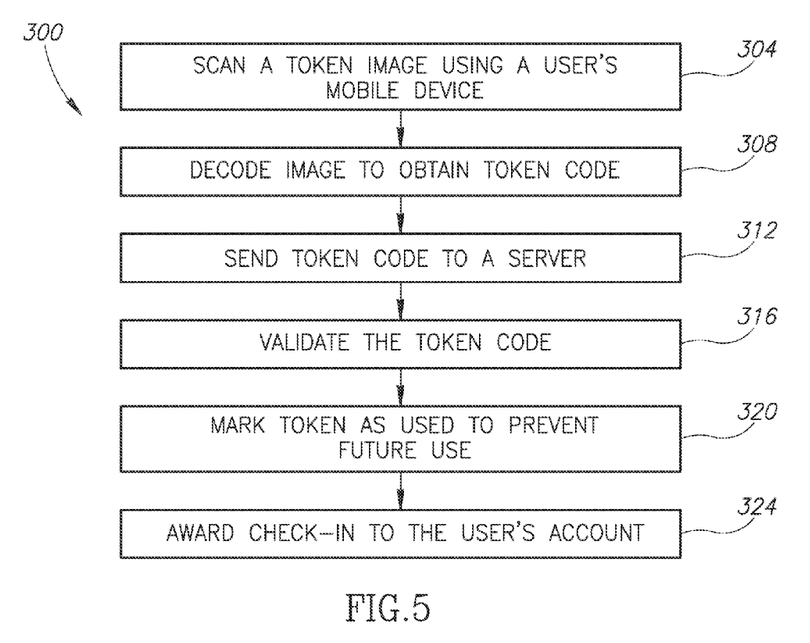
FIG. 5 is a flow chart of a method for allowing a user to check-in at a location using the system of FIG. 1.

FIG. 5 illustrates a process 300 for allowing a user to check-in at a location, such as the business 150, using the system 100 of FIG. 1. As mentioned above, the check-in location may be mobile. For example, a promoter may carry the display device 154 (e.g., a digital photo keychain) with him/her as it displays token images. A user (or customer) that is physically present at the check-in location may scan a token image 160 displayed on the display device 154 using the image capture device 136 of the user mobile device 134, block 304. The decode application 138 executing on the user mobile device 134 may then decode the image 160 to determine a token code 144 that corresponds to the token image, block 308. As discussed above, the image 160 may also be sent to the server 104, which decodes the image. The user mobile device 134 may then send the determined token code 144 to the server 104 over the network 130, block 312. The server 104 then validates the token code 144 based on data previously saved in the token repository 120 regarding the series and sequence number of its corresponding token 121, and (optionally) based on other business rules or terms stored in the usage terms repository 124, block 316. The server 104 then marks the token 121 as used to prevent future use (in some embodiments), and awards the check-in to the user's account, blocks 320 and 324.

As an example, a first user may scan a token image 160 that corresponds to a token having a first number (e.g., 100). A second user may scan a token image 160 several minutes after the first user that corresponds to a token having a second number (e.g., 200) greater than the first number. If a third user scans a token image 160 several minutes after the second user, the server 104 may be operative to determine an expected value or range for the token (e.g., 300, between 250 and 350, etc.). If the token image 160 scanned by the third user has a token value that is less than the token value of the second user or a value that is otherwise unexpected, the server 104 will detect that the token value is not properly ordered and will determine that the check-in may be fraudulent (e.g., the third user may have scanned a previously displayed token image). This prevents users from scanning copies of token images from remote locations just to obtain rewards offered for check-ins.

The server 104 may utilize scanning times, token values, user's history, geo-location, additional information, and/or combinations thereof to determine whether a received token code 144 is fraudulent. For example, the server 104 may be operative to detect the rate at which images 160 are displayed on the display device 154 by receiving multiple token codes and the times they were scanned by users. As an illustration, if the server 104 receives two token codes that are separated in expected order by 60 tokens, and the token codes are scanned 10 minutes apart, the server 104 may determine that each token image is displayed for 10 seconds (i.e., 10 minutes/60 token images=10 seconds per token image). This information can be used to assist with predicting whether an attempted check-in is fraudulent. In other embodiments, the server 104 may simply rely on the expected order of received token codes 144 to determine whether a check-in is fraudulent.

In some embodiments, it may be undesirable to store the tokens 121, the token codes 123, and the token images 122 in the repository 120. In some embodiments, a predictable series of tokens (e.g., sequential numbers) may be used, and the series information 125 (e.g., series identifier, series start, series end, etc.) may be stored in the repository 120. A cryptography key 126 may be generated for the series and stored in the repository 120. Then, each token is encrypted using the key (e.g., token code=encrypted token and the series identifier). The token codes are then used to generate the token images, which need not be stored in the repository 120. The verification step (block 316) may be done using the same key to decrypt the token based on the token's series.

As discussed above, while a token generally should only be used once within a short period of time (e.g., within minutes), in some embodiments tokens may be reused at a later time when the same series is activated again. In other embodiments, a large number of ordered tokens may be displayed repeatedly in a "loop." Since the codes are ordered, it would be difficult or impossible for a malicious user to replay a previously seen code at exactly the right time (e.g., in the correct order of the sequence at a later time). For example, if a series of token images encoded 10,000 numbered tokens, the server 104 would expect the token values to reset back to the $1^{st}$ ordered token image after the $10,000^{th}$ ordered token image is displayed.

In some embodiments, the system 100 may be operated by the entity 132 offering the check-ins, such as a social networking service, a loyalty or reward service, the business 150, or another other service or entity. In other embodiments, the system 100 may be provided as a web service that may be accessed by organizations offering check-in capabilities (e.g., stores, restaurants, social network services, etc.). It will be appreciated that the system 100 may be implemented in other physical or logical configurations as desired.

Computing System

Figure 6:
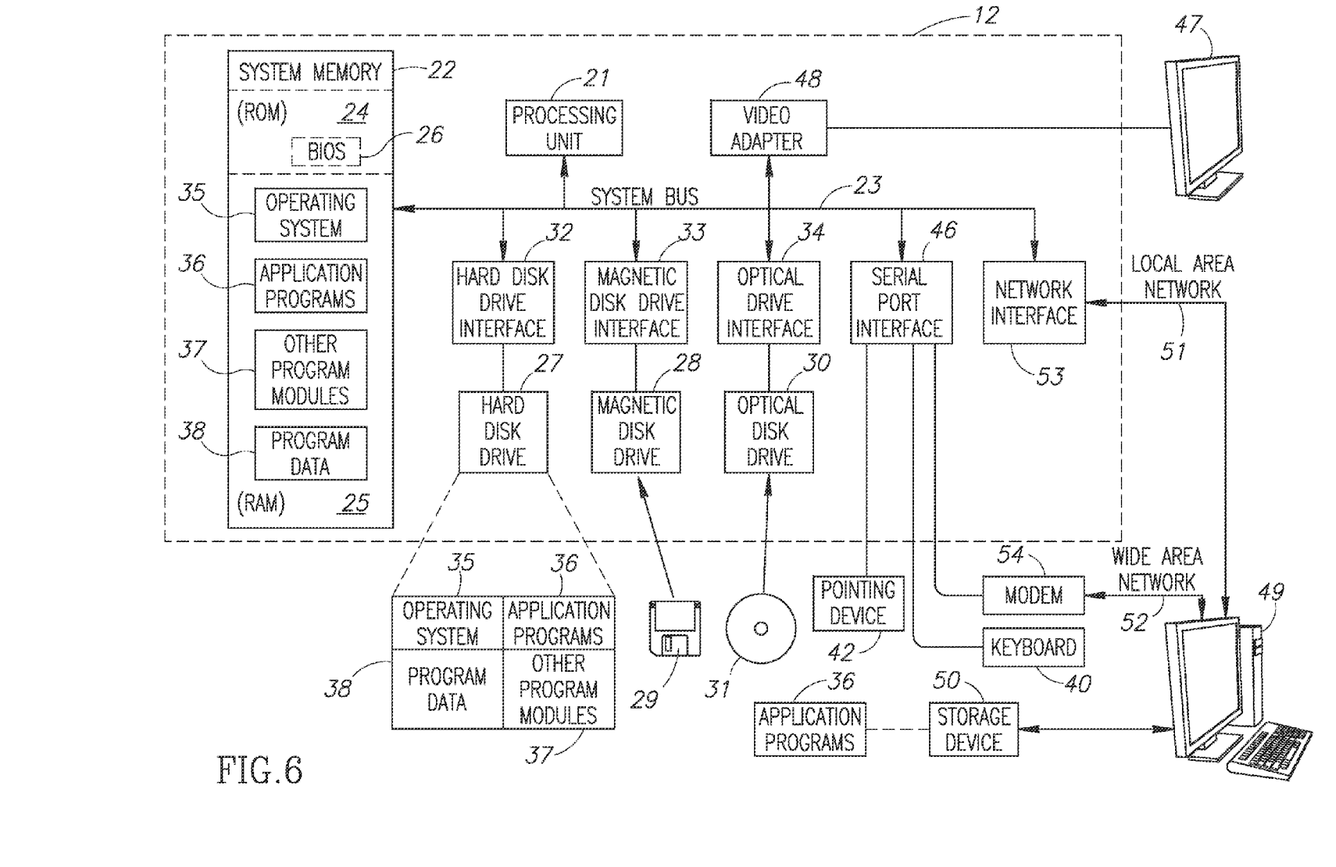
FIG. 6 depicts a diagram of a hardware environment and an operating environment in which one or more computing devices associated with the fraud-proof location identification system of the present invention may be implemented.

FIG. 6 is a diagram of hardware and an operating environment in conjunction with which implementations of the fraud-proof location identification system 100 may be practiced. The description of FIG. 6 is intended to provide a brief, general description of suitable computer hardware and a suitable computing environment in which implementations may be practiced. Although not required, implementations are described in the general context of computer-executable instructions, such as program modules, being executed by a computer, such as a personal computer or the like. Generally, program modules include routines, programs, objects, components, data structures, etc., that perform particular tasks or implement particular abstract data types.

Moreover, those skilled in the art will appreciate that implementations may be practiced with other computer system configurations, including hand-held devices, multiprocessor systems, microprocessor-based or programmable consumer electronics, network PCs, minicomputers, mainframe computers, cloud computing architectures, and the like. Implementations may also be practiced in distributed computing environments where tasks are performed by remote processing devices that are linked through one or more communications networks. In a distributed computing environment, program modules may be located in both local and remote memory storage devices.

The exemplary hardware and operating environment of FIG. 6 includes a general-purpose computing device in the form of a computing device 12. The computing device 12 includes the system memory 22, a processing unit 21, and a system bus 23 that operatively couples various system components, including the system memory 22, to the processing unit 21. There may be only one or there may be more than one processing unit 21, such that the processor of computing device 12 comprises a single central-processing unit (CPU), or a plurality of processing units, commonly referred to as a parallel processing environment. The computing device 12 may be a conventional computer, a distributed computer, or any other type of computer.

The system bus 23 may be any of several types of bus structures including a memory bus or memory controller, a peripheral bus, and a local bus using any of a variety of bus architectures. The system memory 22 may also be referred to as simply the memory, and may include read only memory (ROM) 24 and random access memory (RAM) 25. A basic input/output system (BIOS) 26, containing the basic routines that help to transfer information between elements within the computing device 12, such as during start-up, may be stored in ROM 24. The computing device 12 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media. The computing device 12 may also include one or more other types of memory devices (e.g., flash memory storage devices, and the like).

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules, and other data for the computing device 12. It should be appreciated by those skilled in the art that any type of computer-readable media which can store data that is accessible by a computer, such as magnetic cassettes, flash memory cards, USB drives, digital video disks, Bernoulli cartridges, random access memories (RAMs), read only memories (ROMs), and the like, may be used in the exemplary operating environment. As is apparent to those of ordinary skill in the art, the hard disk drive 27 and other forms of computer-readable media (e.g., the removable magnetic disk 29, the removable optical disk 31, flash memory cards, USB drives, and the like) accessible by the processing unit 21 may be considered components of the system memory 22. Further, "non-transitory" computer-readable media comprises all computer-readable media, with the sole exception being a transitory, propagating signal.

A number of program modules may be stored on the hard disk drive 27, magnetic disk 29, optical disk 31, ROM 24, or RAM 25, including an operating system 35, one or more application programs 36, other program modules 37 (e.g., one or more of the modules and applications described above), and program data 38. A user may enter commands and information into the computing device 12 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus 23, but may be connected by other interfaces, such as a parallel port, game port, a universal serial bus (USB), or the like. A monitor 47 or other type of display device is also connected to the system bus 23 via an interface, such as a video adapter 48. In addition to the monitor, computers typically include other peripheral output devices (not shown), such as speakers and printers.

The computing device 12 may operate in a networked environment using logical connections to one or more remote computers, such as remote computer 49. These logical connections are achieved by a communication device coupled to or a part of the computing device 12 (as the local computer). Implementations are not limited to a particular type of communications device. The remote computer 49 may be another computer, a server, a router, a network PC, a client, a memory storage device, a peer device or other common network node, and typically includes many or all of the elements described above relative to the computing device 12. The remote computer 49 may be connected to a memory storage device 50. The logical connections depicted in FIG. 6 include a local-area network (LAN) 51 and a wide-area network (WAN) 52. Such networking environments are commonplace in offices, enterprise-wide computer networks, intranets and the Internet.

When used in a LAN-networking environment, the computing device 12 is connected to the local area network 51 through a network interface or adapter 53, which is one type of communications device. When used in a WAN-networking environment, the computing device 12 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computing device 12, or portions thereof, may be stored in the remote computer 49 and/or the remote memory storage device 50. It is appreciated that the network connections shown are exemplary and other means of and communications devices for establishing a communications link between the computers may be used.

The computing device 12 and related components have been presented herein by way of particular example and also by abstraction in order to facilitate a high-level view of the concepts disclosed. The actual technical design and implementation may vary based on particular implementation while maintaining the overall nature of the concepts disclosed.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. A system for providing fraud-proof location identification, the system comprising:
a server computing device including one or more processors configured to execute location identification instructions, and the server computing device being configured to provide an interface for communicating with a plurality of user computing devices over a network, when executed by the one or more processors the location identification instructions being operative to:
generate a plurality of ordered tokens associated with a check-in location;
generate a plurality of token codes that each correspond to one of the plurality of ordered tokens;
generate a plurality of machine-readable images that each encodes one of plurality of token codes;
receive, from one of the plurality of user computing devices over the network, one of the plurality of token codes or one of the plurality of machine-readable images that encodes one of the plurality of token codes;
identify one of the plurality of tokens as corresponding to the received token code or received machine-readable image; and
determine whether the user is physically present at the check-in location based upon an order of the identified token in the plurality of ordered tokens.

2. The system of claim 1, wherein the location identification instructions are further operative to send the plurality of machine-readable images to a computing device associated with the check-in location over the network so that the plurality of images may subsequently be transferred to a display device associated with the check-in location that is not coupled to the server computing device.

3. The system of claim 1, further comprising a portable memory device for storing the plurality of machine-readable images, the portable memory device being configured for use with a display device associated with the check-in location.

4. The system of claim 1, wherein the location identification instructions are further operative to receive, at the server computing device, a request for activation of at least a subset of the plurality of tokens from an entity associated with the check-in location; and to activate at least a subset of the plurality of tokens based upon the received activation request.

5. The system of claim 1, further comprising a display device positioned at the check-in location that is not couplable to the server computing device, the display device being configured for displaying the machine-readable images according to the order of the plurality of ordered tokens.

6. A system for providing fraud-proof location identification, the system comprising:
a server computing device including one or more processors configured to execute location identification instructions, and the server computing device being configured to provide an interface for communicating with a plurality of user computing devices over a network, when executed by the one or more processors the location identification instructions being operative to:
generate a plurality of ordered tokens associated with a check-in location, a display device being positioned at the check-in location that is not couplable to the server computing device;
generate a plurality of token codes that each correspond to one of the plurality of ordered tokens;
generate a plurality of machine-readable images that each encodes a token code;
receive a token code or a machine-readable image that encodes a token code from one of the plurality of user computing devices over the network;
determine the identity of the one of the plurality of tokens corresponding to the received token code or received machine-readable image; and
determine whether the user is physically present at the check-in location based upon the order of the determined token in the ordered plurality of tokens, the display device being configured to display the machine-readable images according to the order of the tokens, the display device comprising a digital photo frame configured to operate in a slideshow mode wherein the digital photo frame displays images stored on a memory device associated therewith.

7. The system of claim 1, wherein the location identification instructions are further operative to receive a selection of usage terms over the network from a computing device associated with the check-in location; and to associate the selected usage terms with the plurality of tokens.

8. The system of claim 1, wherein when executed by the one or more processors, the location identification instructions are further operative to send a verification of the user's location to an entity associated with the check-in location over the network.

9. The system of claim 8, wherein the entity comprises a social networking service, an entity associated with the check-in location, a loyalty service, or a rewards service.

10. The system of claim 1, wherein the machine-readable images comprise quick response (QR) barcodes.

11. The system of claim 1, further comprising:
a display device positioned at the check-in location that is not couplable to the server computing device, the display device being configured to display the machine-readable images according to the order of the plurality of ordered tokens, wherein the token code received from the one of the user computing devices over the network is decoded after the user computing device scans a machine-readable image representative of the token code.

12. The system of claim 1, wherein the location identification instructions are further operative to determine whether the user of the user computing device is physically present at the check-in location by utilizing the time at which the token code was received from the user computing device.

13. The system of claim 1, wherein the ordered tokens are sequentially ordered.

14. The system of claim 1, wherein the machine-readable image encoding one of the plurality of token codes is received, and when executed by the one or more processors, the location identification instructions are further operative to decode the machine-readable image to determine the identity of the one of the plurality of tokens corresponding to the received machine-readable image.

15. A computer implemented method for providing fraud-proof location identification, the method comprising:

providing a server computing device configured for communicating with a plurality of user computing devices over a network;

generating a plurality of ordered tokens associated with a check-in location;

storing series information in a data storage associated with the server computing device, the series information providing an identification of the order of the plurality of ordered tokens;

generating a plurality of token codes that each corresponds to one of the plurality of ordered tokens;

generating a plurality of machine-readable images that each encodes a token code;

receiving, at the server computing device, a token code or a machine-readable image from one of the user computing devices over the network;

determining the identity of the one of the plurality of tokens corresponding to the token code or machine-readable image received from the user computing device; and determining whether the user of the user computing device is physically present at the check-in location based upon the order of the determined token in the ordered plurality of tokens.

16. The computer-implemented method of claim 15, further comprising sending the plurality of machine-readable images to the check-in location for ordered display on a display device.

17. The computer-implemented method of claim 16, wherein the plurality of machine-readable images is sent to a computing device associated with the check-in location over the network so that the plurality of images may subsequently be transferred to a display device associated with the check-in location that is not coupled to the network.

18. The computer-implemented method of claim 16, wherein the plurality of machine-readable images is sent to the check-in location on a portable memory device configured for use with a display device associated with the check-in location.

19. The computer-implemented method of claim 15, further comprising:

receiving, at the server computing device, a request for activation of at least a subset of the plurality of tokens from an entity associated with the check-in location; and activating at least a subset of the plurality of tokens based upon the received activation request.

20. The computer-implemented method of claim 15, further comprising:

displaying the plurality of machine-readable images in order on a display device positioned at the check-in location, wherein the display device is not coupled to the server computing device while displaying the machine-readable images.

21. A computer implemented method for providing fraud-proof location identification, the method comprising:

providing a server computing device configured for communicating with a plurality of user computing devices over a network;

generating a plurality of ordered tokens associated with a check-in location;

storing series information in a data storage associated with the server computing device, the series information providing an identification of the order of the plurality of ordered tokens;

generating a plurality of token codes that each corresponds to one of the plurality of ordered tokens;

generating a plurality of machine-readable images that each encodes a token code;

receiving, at the server computing device, a token code or a machine-readable image from one of the user computing devices over the network;

determining the identity of the one of the plurality of tokens corresponding to the token code or machine-readable image received from the user computing device;

determining whether the user of the user computing device is physically present at the check-in location based upon the order of the determined token in the ordered plurality of tokens; and displaying the plurality of machine-readable images in order on a display device positioned at the check-in location, wherein the display device is not coupled to the server computing device while displaying the machine-readable images, the display device comprising a digital photo frame configured to operate in a slideshow mode wherein the digital photo frame displays images stored on a memory device associated therewith.

22. The computer implemented method of claim 15, further comprising receiving a selection of usage terms over the network from a computing device associated with the check-in location; and associating the selected usage terms with the plurality of tokens.

23. The computer-implemented method of claim 15, further comprising sending a verification of the user's location to an entity associated with the check-in location over the network.

24. The computer-implemented method of claim 15, wherein the machine-readable images comprise quick response (QR) barcodes.

25. The computer-implemented method of claim 15, wherein the token code received from the one of the user computing devices over the network is decoded after the user computing device scans a machine-readable image that encodes the token code.

26. The computer-implemented method of claim 15, wherein determining whether the user of the user computing device is physically present at the check-in location comprises utilizing the time at which the token code was received from the user computing device.

27. The computer-implemented method of claim 15, wherein generating a plurality of token codes that each corresponds to one of the plurality of ordered tokens comprises utilizing a cryptography key.

28. The computer-implemented method of claim 27, wherein determining the identity of the one of the plurality of tokens corresponding to the token code or machine-readable image received from the user computing device comprises decrypting a token code utilizing the cryptography key.

29. A computer implemented method for providing fraud-proof location identification, the method comprising:
   providing a server computing device configured for communicating with a plurality of user computing devices over a network;
   generating a plurality of ordered tokens associated with a check-in location;
   generating a plurality of token codes that each corresponds to one of the plurality of ordered tokens;
   sending the plurality of token codes or a plurality of machine-readable images encoding the plurality of token codes to the check-in location for display on a display device positioned at the check-in location, the display device not being coupled to the server computing device;
   displaying the plurality of machine-readable images on the display device in a predetermined order so that a user may scan one of the machine-readable images using a user computing device;
   receiving, at the server computing device, the scanned machine-readable image from the user computing device over the network;
   decoding the received machine-readable image to determine its corresponding token code;
   determining the identity of the one of the plurality of tokens corresponding to the determined token code; and
   determining whether the user of the user computing device is physically present at the check-in location based upon the order of the determined token in the ordered plurality of tokens.

30. An article of manufacture comprising a non-transitory computer readable medium having stored therein components executable by a processor of a computer for performing a process for providing fraud-proof location identification, the computer being configured for communication with a plurality of user computing devices over a network, the process comprising:
   generating a plurality of ordered tokens associated with a check-in location;
   generating a plurality of token codes that each corresponds to one of the plurality of ordered tokens;
   generating a plurality of machine-readable images that each encodes a token code;
   receiving, at the server computing device, a token code or a machine-readable image encoding a token code from one of the user computing devices over the network;
   determining the identity of the one of the plurality of tokens corresponding to the token code or machine-readable image received from the user computing device; and
   determining whether the user of the user computing device is physically present at the check-in location based upon the order of the determined token in the ordered plurality of tokens.

* * * * *